United States Patent [19]
Kawai et al.

[11] Patent Number: 5,878,390
[45] Date of Patent: Mar. 2, 1999

[54] SPEECH RECOGNITION APPARATUS EQUIPPED WITH MEANS FOR REMOVING ERRONEOUS CANDIDATE OF SPEECH RECOGNITION

[75] Inventors: Jun Kawai, Osaka; Yumi Wakita, Nara, both of Japan

[73] Assignee: ATR Interpreting Telecommunications Research Laboratories, Kyoto, Japan

[21] Appl. No.: 880,403

[22] Filed: Jun. 23, 1997

[30] Foreign Application Priority Data

Dec. 20, 1996 [JP] Japan .................................. 8-341084
Jun. 18, 1997 [JP] Japan .................................. 9-161243

[51] Int. Cl.[6] ................................... G10L 9/00
[52] U.S. Cl. ........................ 704/231; 704/239; 704/256
[58] Field of Search .................................. 704/231, 239, 704/256, 255, 240, 243, 241

[56] References Cited

U.S. PATENT DOCUMENTS 5,457,768 10/1995 Tsuboi et al. ............................. 704/231
5,740,318 4/1998 Naito et al. ............................. 704/248

OTHER PUBLICATIONS

Bahl et al., "A Maximum Likelihood Approach to Continuous Speech Recognition"; *IEEE Transactions on Pattern Analysis and Machine Intelligence*, Mar. 1983; pp. 179–190.

Eiichiro Sumita et al., "An Example–Based Disambiguation of English Prepositional Phrase Attachment"; *1995 Scripta Technica, Inc.,* Mar. 1994; pp. 557–565.

Oamu Furuse, "Transfer–Driven Machine Translation Utilizing Empirical Knowledge"; pp. 414–425.

Osamu Furuse, "Incremental Translatio Utilizing Constituent Boundary Patterns", *ATR Interpreting Telecommunications Research Laboratories,* pp. 412–417.

*Primary Examiner*—David D. Knepper
*Assistant Examiner*—Susan Wieland

[57] ABSTRACT

A speech recognition apparatus which includes a speech recognition section for performing a speech recognition process on an uttered speech with reference to a predetermined statistical language model, based on a series of speech signal of the uttered speech sentence composed of a series of input words. The speech recognition section calculates a functional value of a predetermined erroneous sentence judging function with respect to speech recognition candidates, where the erroneous sentence judging representing a degree of unsuitability for the speech recognition candidates. When the calculated functional value exceeds a predetermined threshold value, the speech recognition section performs the speech recognition process by eliminating a speech recognition candidate corresponding to a calculated functional value.

12 Claims, 6 Drawing Sheets

Japanese Example of Word Set and Distance

English Example of Word Set and Distance

SPEECH RECOGNITION APPARATUS EQUIPPED WITH MEANS FOR REMOVING ERRONEOUS CANDIDATE OF SPEECH RECOGNITION

BACKGROUND OF THE INVENTION

1. Field of the Invention

The present invention relates to a speech recognition apparatus for recognizing speech based on a speech signal of utterance speech with reference to a statistical language model, and in particular, to a speech recognition apparatus equipped with means for removing an erroneous candidate of speech recognition.

2. Description of the Prior Art

In continuous speech recognition apparatuses, a statistical language model based on a statistical method which is so called N-gram is widely used (See, for example, a prior art document 1, L. R. Bahl et al., "A Maximum Likelihood Approach to Continuous Speech Recognition", IEEE Transactions on Pattern Analysis and Machine Intelligence, pp. 179–190, 1983). In a continuous speech recognition apparatus using an N-gram, improvement in the speech recognition rate is intended by previously training the transition probability, at which a transition is made from preceding N−1 words to the next word, with large-scale training data, and by predicting a word to be next connected with the trained transition probability at the time of speech recognition. Generally speaking, the larger the N grows, the more the prediction accuracy for the next word improves, whereas the number of kinds of word concatenation becomes large, this requires large amounts of training data to obtain reliable transition probabilities. Thus, under the existing circumstances, N is in many cases set to 2(in the case of bi-gram) or 3(in the case of tri-gram) or so for practical use. However, upon analyzing results of continuous speech recognition using the bi-gram of words or tri-gram of words, even if local word concatenations within 2 or 3 words have naturalness, unnatural mis-recognized sentence would frequently be outputted, when viewing the whole sentence. Thus, it is considered that more general language restrictions are necessary.

There have been language models that enable more general restrictions with the use of grammars such as context-free grammar and dependency relationships among words. However, taking into account the structure of natural utterance sentences and the various kinds of dependency relationships, it is difficult to build rules and dependency relationships, while the amount of processings become remarkably larger. On the other hand, a method for solving the ambiguity of syntactic construction by an example-led approach was proposed in a prior art document 2, Eiichiro Sumida et al., "An Example-Led Solution of Ambiguities on Destinations of Prepositive Words and Phrases in English", The Transactions of the Institute of Electronic Information and Communication Engineers of Japan (D-II), J77-D-II, No 3, pp. 557–565, "March 1994" (hereinafter, referred to as a prior art example). The method of this prior art example includes steps of extracting examples from corpus, calculating semantic distances between the expression of an input sentence and examples according to a thesaurus, and selecting such a sentence construction that the final semantic distance is minimized. The effects of this method were also confirmed for equivalent-word decision process or the like (See a prior art document 3, Furuse et al., "transform-led machine translation utilizing empirical knowledge", Transactions of the Information Processing Society of Japan, Vol. 35, No 3, pp. 414–423, March 1994).

However, in the speech recognition apparatuses using the method of the above-mentioned prior art example, there has been such a problem, for example, that inputting a sentence of unnatural construction with respect to trained examples would result in increased distances from any of the examples so that the resulting speech recognition rate would be relatively low.

SUMMARY OF THE INVENTION

An essential object of the present invention is to provide a speech recognition apparatus capable of removing erroneous mis-recognition results, outputting sentences suitable both locally and generally, and obtaining a speech recognition rate higher than that of the prior art example.

In order to achieve the aforementioned objective, according to one aspect of the present invention, there is provided a speech recognition apparatus comprising:

speech recognition means for performing a speech recognition process on an uttered speech with reference to a predetermined statistical language model, based on a series of speech signal of the uttered speech sentence composed of a series of input words, wherein said speech recognition means calculates a functional value of a predetermined erroneous sentence judging function with respect to speech recognition candidates, said erroneous sentence judging representing a degree of unsuitability for the speech recognition candidates, and wherein said speech recognition means performs the speech recognition process by eliminating a speech recognition candidate corresponding to a calculated functional value when the calculated functional value exceeds a predetermined threshold value.

In the above-mentioned speech recognition apparatus, the functional value of the erroneous sentence judging function is preferably a value obtained by calculating a sum of semantic distances corresponding to rules used in the speech recognition process, multiplying a calculated sum by a number of morphemes contained in a speech recognition candidate for which speech recognition process is performed, and dividing a multiplied sum by a number of rules used in the speech recognition process.

In the above-mentioned speech recognition apparatus, the functional value of the erroneous sentence judging function is preferably a value obtained by calculating a sum of semantic distances corresponding to rules used in the speech recognition process, calculating an average value of the semantic distances which is obtained by dividing a calculated sum by the number of rules used in the speech recognition process, multiplying a calculated average value of the semantic distances by a number of morphemes contained in a speech recognition candidate for which speech recognition process is performed, and dividing a multiplied sum by a number of rules used in the speech recognition process.

In the above-mentioned speech recognition apparatus, the functional value of the erroneous sentence judging function is preferably a value obtained by calculating a sum of semantic distances corresponding to rules used in the speech recognition process, calculating an average value of the semantic distances which is obtained by dividing a calculated sum by the number of rules used in the speech recognition process, and dividing a calculated average value of the semantic distances by a number of rules each of which includes a predetermined plurality or more of morphemes within the rules used in the speech recognition process at a stage when a predetermined number of morphemes has been processed.

In the above-mentioned speech recognition apparatus, the threshold value is preferably a constant value.

In the above-mentioned speech recognition apparatus, the threshold value is preferably changed depending on a number of morphemes contained in a partial sentence for which the speech recognition process is performed.

Accordingly, there can be provided a speech recognition apparatus which can eliminate erroneous mis-recognition results, output locally and generally suitable or correct sentences and obtain a speech recognition ratio higher than that of the prior art example.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3 is an operational view showing an operation of a Japanese processing of the speech recognition apparatus of FIG. 1, wherein FIG. 3(a) shows an input Japanese sentence, FIG. 3(b) shows a sentence of recognition results, and its parsing tree and score, and FIG. 3(c) shows a sentence of results of parsing analysis and its parsing tree and score;

FIG. 6 is an operational view showing an operation of an English processing of the speech recognition apparatus of FIG. 1, wherein FIG. 6(a) shows an input Japanese sentence, FIG. 6(b) shows a sentence of recognition results, and its parsing tree and score, and FIG. 6(c) shows a sentence of results of parsing analysis and its parsing tree and score.

DETAILED DESCRIPTION OF THE PREFERRED EMBODIMENTS

Preferred embodiments according to the present invention will be described below with reference to the attached drawings.

Figure 1:
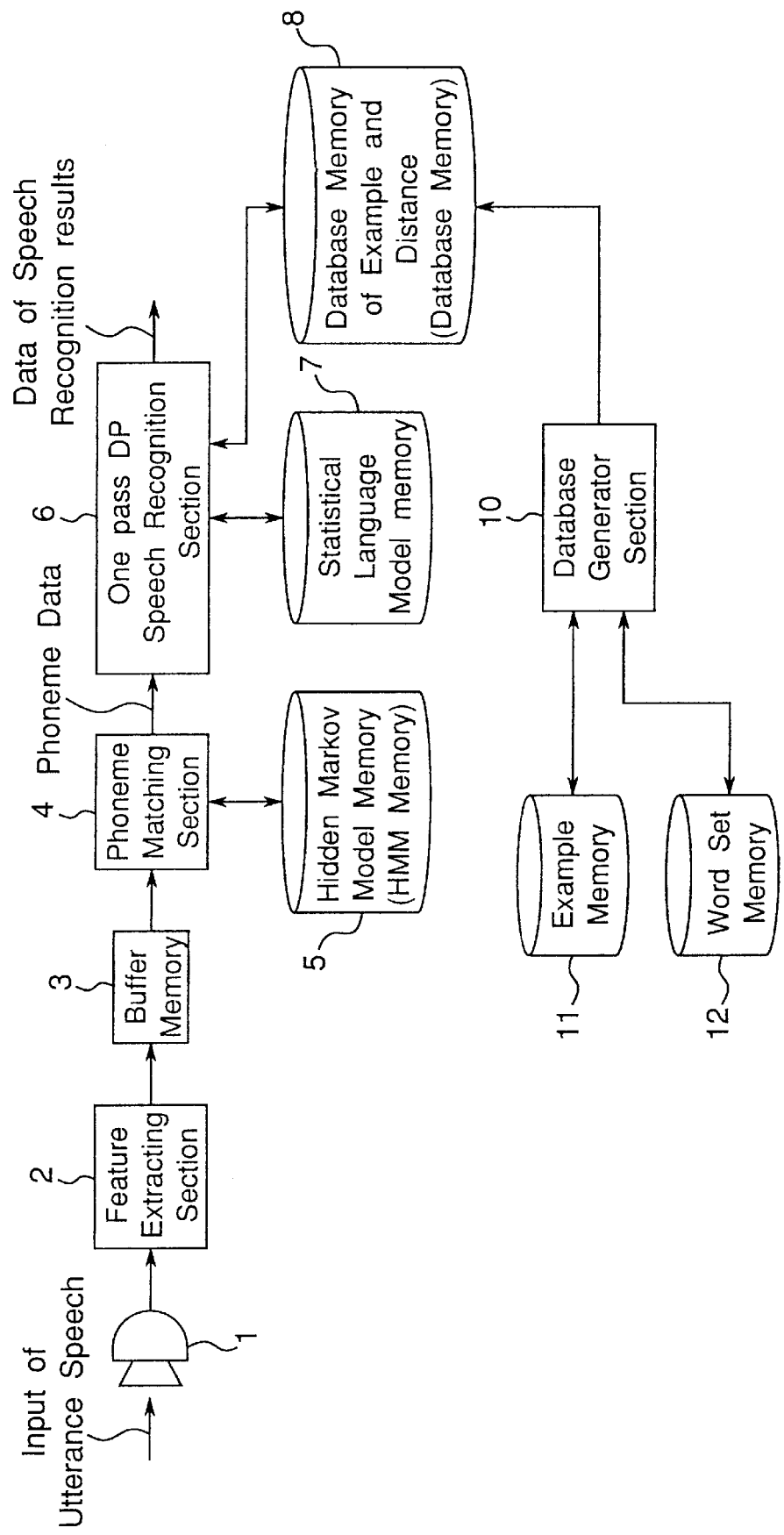
FIG. 1 is a block diagram of a speech recognition apparatus of a preferred embodiment according to the present invention.

FIG. 1 is a block diagram showing a construction of a speech recognition apparatus of a preferred embodiment according to the present invention.

This speech recognition apparatus of the present preferred embodiment shown in FIG. 1 comprises:

(a) a microphone 1;

(b) a feature extracting section 2;

(c) a buffer memory 3;

(d) a phoneme matching section 4 for executing a phoneme matching process with reference to a hidden Markov model (hereinafter, referred to as an HMM), which is an acoustic model stored in a hidden Markov model memory (hereinafter, referred to as an HMM memory), based on input uttered speech data, and then outputting extracted phoneme data; and (e) a One pass DP speech recognition section 6 for executing speech recognition with reference to a database of examples and distances stored in a statistical language model memory 7 using a One pass DP (Viterbi search) algorithm based on phoneme data derived from the phoneme matching section 4.

Using a predetermined erroneous sentence judging function or unsuitable sentence judging function (indicated by the Equation (1) which will be detailed later) representing a degree of suitability with respect to speech recognition candidates, the speech recognition section 6 is characterized in calculating a functional value of the erroneous or suitable sentence judging function with respect to the speech recognition candidates, then if the calculated functional value exceeds a predetermined threshold value Fth, the One pass DP speech recognition section 6 removes the corresponding speech recognition candidate, thus accomplishing the speech recognition. The functional value of the erroneous sentence judging function is preferably a value obtained by calculating a sum of semantic distances corresponding to rules used in the speech recognition process, multiplying a calculated sum by a number of morphemes contained in a speech recognition candidate for which speech recognition process is performed, and dividing a multiplied sum by a number of rules used in the speech recognition process. Further, the threshold value Fth is preferably a constant- value or is changed depending on the number of morphemes contained in a partial sentence used in speech recognition process. In addition, the morpheme, which is the smallest unit of a series of characters having meanings such as stems, prefixes and suffixes, is a unit which is substantially the same as or slightly smaller than words.

First of all, a method for detecting an erroneous or suitable sentence used in the speech recognition section 6 will be described. Mis-recognitions using the N-gram have the following features:

(a) Judging from concatenations of N or more words, there are present grammatically or semantically erroneous combinations of words. An example of mis-recognition is as follows: "Denwa bangou ga 2107-go shitsu desu ka." —in Japanese, this sentence means that "Is the telephone number Room 2107?" in English—.

(b) The structure of a sentence is not united in a larger unit. That is, the sentence does not allow grammatical rules to be applied thereto, only allowing a local judgment. An example of mis-recognition is as follows: "3-mei sama made no ee made shinguru no ippaku no . . . ". —in Japanese, this means that "up to three persons, let me see, one night stay for single room . . . " in English—.

In order to solve mis-recognitions having the above features, it is necessary to judge the consistency among words and the suitability of sentence construction from a point of view broader, or more general, than the N-gram. On the other hand, in the example-led speech translation method (See the prior art document 2 and a prior art document 4, O. Furuse et al., "Incremental Translation Utilizing Constituent Boundary Patterns", Proceedings of Coling'96, 1996), there is adopted a method for determining the sentence construction in a left-to-right direction, using translation knowledge based on examples. In this processing, in order to solve the ambiguities of the sentence construction, semantic distances between an input sentence and examples are calculated by using a thesaurus, and a sentence construction corresponding to the less distance is selected. The present inventors regard the above sentence construction determining method as more consistent to remove mis-recognitions due to the conventional N-gram language model.

(a) The above sentence construction determining method, which is the example-led method, makes it easy to process sentence constructions that have been conventionally difficult to process by the conventional grammar, such as found in conversational sentences;

(b) The above sentence construction determining method, which determines semantic distances based on sentence construction, can judge the consistency among words out of adjacency;

(c) Since both speech recognition and the above sentence construction determining method perform processing in the left-to-right direction, there is a possibility that intermediate results up to certain time points can be judged successively.

Therefore, erroneous sentences are detected from the viewpoints of the matchability of semantic distances, as viewed generally, and the suitability of analyzed sentence constructions. More concretely, the judgment is carried out in the following way. First of all, mismatch of semantic distances in a partial sentence is judged by a semantic distance value that has been used in the above sentence construction determining method. If the total sum of semantic distances of a partial sentence is equal to or larger than a certain threshold value, the sentence is judged as a mis-recognition. The suitability of sentence construction is accounted as follows. It is assumed that a natural sentence composed of a certain or larger number of morphemes would have a united sentence construction, the syntactic structure of the sentence being complex to some extent. Now consider a ratio of the number m of morphemes contained in a partial sentence to the number R of rules of context-free grammar or rules of examples (or number of examples) that have been used for the determination of a sentence construction (i.e., a ratio of m/R). A partial sentence having no united sentence construction would not result in a hierarchical syntactic structure, so that the number R of syntax rules used is smaller relative to the number m of morphemes, with the value of m/R increased. Conversely, the more complex and the more hierarchical the sentence construction is, the smaller the m/R value is. Therefore, the following Equation (1) is defined as an erroneous sentence judging function $F_{error}$ (m):

$$F_{error}(m) = \frac{m}{R} \sum_{i=1}^{R} d(r_i) \quad (1)$$

In this Equation (1), $d(r_i)$ is the semantic distance or similarity distance corresponding to a plurality of examples or rules $r_1$;

m is the number of morphemes contained in a partial sentence of a speech recognition candidate, for which the speech recognition is to be performed; and R is the number of examples or rules that have been used for determining the sentence construction of the partial sentence of the speech recognition candidate.

In addition, the semantic distance or similarity distance refers to a semantic distance between a speech recognition candidate of an input uttered speech sentence and examples, and this distance is defined by, for example, the Equation (1) on page 559 in the prior art document 2, and is calculated by using a thesaurus. In the preferred embodiment, the semantic distance or similarity distance is determined by searching the distances relative to the examples in the database corresponding to the partial sentence of the speech recognition candidate. The thesaurus is defined as a dictionary in which higher-and-lower order relationships among concepts are expressed in a tree structure, where words having relevant concepts are allocated to the lowest-order concepts corresponding to leaves. The semantic distances among words are defined by semantic distances among concepts on the thesaurus, where the distances among concepts are set to values of 0 to 1 according to the position of the smallest common upper-order concept in the thesaurus. A value 0 means that two concepts are the same as each other, while a value 1 means that two concepts have no relationship to each other.

The judging function $F_{error}$ (m) is a function of the number m of morphemes, which is calculated for a partial sentence of a speech recognition candidate delimitated by the first to m-th morphemes of the sentence. If the value of this judging function $F_{error}$ (m) exceeds the threshold value Fth, the speech recognition section 6 judges the partial sentence of the speech recognition candidate as a mis-recognition result, then eliminates the same out of the speech recognition candidates. It is noted that the Equation (1) can be applied, preferably, when m≧5.

It is to be noted that when the number R of the rules in the Equation (1) is equal to zero, the functional value is set to one, and then it is judged as a mis-recognition result, eliminating the same out of the speech recognition candidates.

In the preferred embodiment of FIG. 1, a database generator section 10 generates a database based on the examples stored in an example memory 11 and word sets stored in a word set memory 12, by using predetermined similarity rules, and stores the generated database in the database memory 8. An instance of the examples of the context-free grammar rules is shown in the following Tables 1 and 2. Also, an instance of the similarity rules is shown in the following Table 3.

TABLE 1

| Example 1 |
| --- |
| X no Y -in Japanese, this means "Y of X" in English-<br>    Boku no Kodomo -in Japanese, this means "my child(ren)" in English-<br>    Anata no Kaisha -in Japanese, this means "your company" in English- |

TABLE 2

| Example 2 |
| --- |
| X ga Y -in Japanese, this means "X am/is/are Y" in English-<br>    Boku ga Sensei -in Japanese, this means "I am a teacher" in English- |

TABLE 3

| Similarity rule |
| --- |
| (I) If the sentence generated by a combination of word sets is the same as an example, then the distance = 0.<br>(II) If the sentence generated by a combination of word sets has the same functional word as that in an example (e.g., "no" or "ga" in Japanese or "of" or "am/is/are" in English) and has a word set of the same similarity category as that in a word set of an example, then the distance = $10^{-5}$.<br>(III) If the sentence generated by a combination of word sets is a combination of words which are not contained in an example, then the distance = 0.5. |

Figure 2:
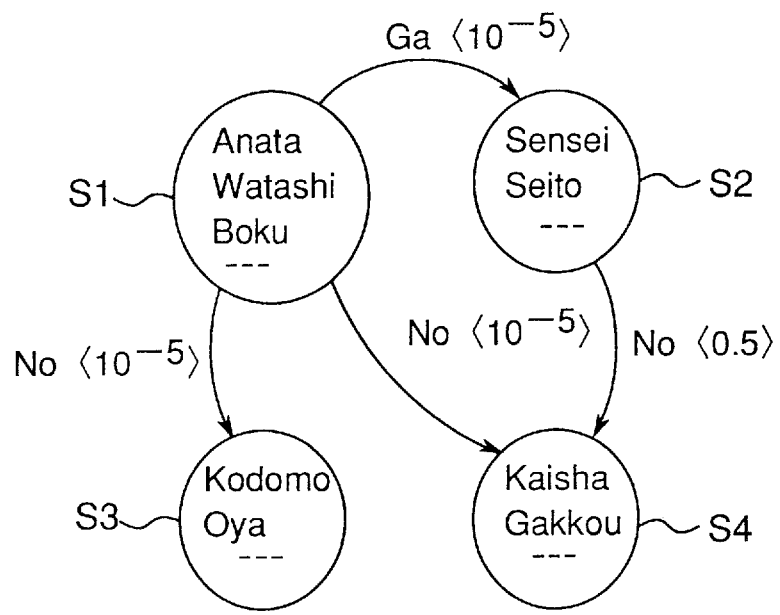
FIG. 2 is a view showing a relationship between Japanese word set and distance in the speech recognition apparatus of FIG. 1.

FIG. 2 shows an instance of Japanese word sets S1, S2, S3 and S4, as well as distances resulting when predetermined functional words are used between the word sets. In the word set S1 of FIG. 2, "Anata" in Japanese means "you" in English, "Watashi" in Japanese means "I (formally)" in English, and "Boku" in Japanese means "I (informally when a boy usually says)" in English. In the word set S2 of FIG. 2, "Sensei" in Japanese means "a teacher" in English, and "Seito" in Japanese means "a student" in English. In the word set S3 of FIG. 2, "Kodomo" in Japanese means "a child/children" in English, and "Oya" in Japanese means "a parent/parents" in English. In the word set S4 of FIG. 2, "Kaisha" in Japanese means "company" in English, and "Gakkou" in Japanese means "school" in English.

Referring to FIG. 2, for example, for a partial sentence of "Anata" (word set S1) Ga "Sensei" (word set S2) —in Japanese, this means "You are a teacher" in English—, the distance is $10^{-5}$; for "Anata" (word set S1) Ga "Kodomo" (word set S3) —in Japanese, this means "You are a child" in English—, the distance is $10^{-5}$; and for "Anata" (word set S1) Ga "Kaisha" (word set S4) —in Japanese, this means "You are a company" in English—, the distance is $10^{-5}$. Also, for a partial sentence of "Anata" (word set S1) no "Kaisha" (word set S4)—in Japanese, this means "your company" in English—, the distance is 0.5.

The database generator section 10 performs the database generating process using the examples of Tables 1 and 2 and the similarity rules of Table 3, as follows. With a partial sentence generated from a combination of word sets, if the partial sentence is "Anata No Kaisha" —in Japanese, this means "you company" in English— then the distance is 0; if the partial sentence is "Watashi No Gakkou" —in Japanese, this means "my school" in English—, then the distance is $10^{-5}$; and if partial sentence is "Kodomo Ga Sensei" —in Japanese, this means "child is a teacher" in English—, then the distance is 0.5. The database of examples and distances of partial sentences generated in this way is stored in the database memory 8.

As for the statistical language model, for instance, a statistical language model of the bi-gram of words is generated based on text data of uttered speech sentences by a method which has been already known to those skilled in the art, and then is stored in the statistical language model memory 7.

Next, the construction and operation of the speech recognition apparatus using the statistical language model of this preferred embodiment will be described.

Referring to FIG. 1, a uttered speech of a speaker is inputted to the microphone 1, which converts the speech into a speech signal, and then, the speech signal is inputted to the feature extracting section 2. The feature extracting section 2 A/D converts the input speech signal to a digital speech signal, executes, for example, LPC analysis on the digital speech signal to extract 34-dimensional feature parameters including the log power, 16-order cepstrum coefficients, Δlog power and 16-order Δcepstrum coefficients. A time series of extracted feature parameters is inputted to the phoneme matching section 4 via the buffer memory 3. The HMM stored in the HMM memory 5 connected to the phoneme matching section 4 comprises a plurality of states and arcs representing transitions between the states, each arc having a transition possibility between the states and an output possibility for input codes. The phoneme matching section 4 executes a phoneme matching process based on input data, and then outputs phoneme data to the speech recognition section 6.

The statistical language model memory 7, which previously stores the statistical language model therein, is connected to the speech recognition section 6. The speech recognition section 6 processes the input phoneme data with reference to the statistical language model stored in the statistical language model memory 7 and the database stored in the database memory 8, using a predetermined One pass DP algorithm, to recognize words having higher probabilities of occurrence as speech recognition candidates, and then calculates a value of the judging function $F_{error}$(m) using the Equation (1) with respect to each of the speech recognition candidates. In this case, for $d(r_1)$ in the Equation (1), the database is searched for examples pertinent to the speech recognition candidate, and the distance corresponding to the found example is taken as the semantic distance $d(r_1)$. Then, if the calculated value of the judging function $F_{error}$ (m) exceeds the predetermined threshold value Fth, the speech recognition section 6 judges the partial sentence of the speech recognition candidate as a mis-recognition result, eliminating the same out of the speech recognition candidates. Then, the speech recognition section 6 decides the remaining speech recognition candidates as the speech recognition result (a series of character data), and then outputs the speech recognition results.

Figure 3:
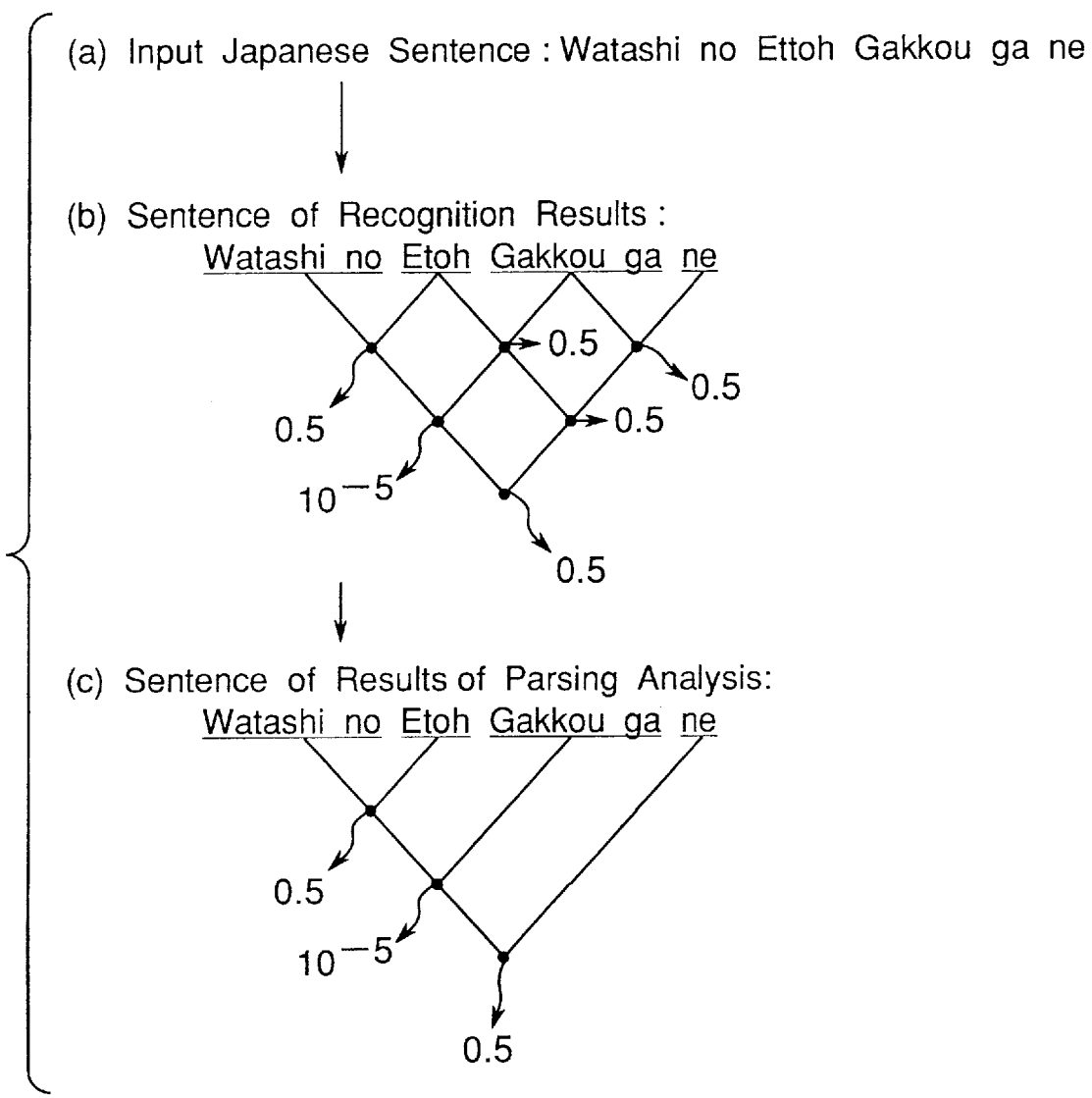

FIG. 3 is an operational view showing the operation of a Japanese processing of the speech recognition apparatus of FIG. 1 constructed as described above, wherein FIG. 3(a) shows an input Japanese sentence, FIG. 3(b) shows a sentence of recognition results and its parsing tree and score, and FIG. 3(c) shows a sentence of results of parsing analysis and its parsing tree and score.

This is a case where when an input sentence of speech, "Watashi no Ettoh Gakkou ga ne" —in Japanese, this means that "My, let me see, school, and" in English—, is inputted as shown in FIG. 3 (a), a sentence of "Watashi no Etoh Gakkou ga ne" —in Japanese, this means "My Etoh (Etoh is a Japanese family name) school, and" in English— is obtained as a sentence of recognition result. That is, the interjection "Ettoh" —in Japanese, this means "let me see" in English— is mis-recognized as the proper noun "Etoh", as shown in FIG. 3(b). The scores between words in the sentence of recognition results are shown in FIG. 3(b). Further, when parsing analysis is performed based on the sentences of recognition results, parse trees of results of parsing analysis is obtained based on a smaller score, as shown in FIG. 3 (c), where the score at that time is obtained. If the case of FIG. 3(c) is applied to the Equation (1), then the erroneous sentence judging function $F_{error}$ (m) can be written as the following Equation (2):

$$\begin{aligned}F_{error}(m) &= (6/3)(0.5 + 0.5 + 10^{-5}) \\ &= 2 \times (1.00001) \\ &= 2.00002\end{aligned} \quad (2)$$

In this instance, the threshold value Fth in judging an erroneous sentence is preferably set to be fallen into a range from 0.6 to 0.7. Since the functional value of 2.00002 calculated at the Equation (2) is beyond the threshold value Fth, speech recognition candidates corresponding to the functional value are eliminated out of the speech recognition candidates. The threshold value Fth may be a certain value or be changed depending on the number m of morphemes contained in the partial sentence for which the speech recognition process is to be performed.

In the speech recognition apparatus constructed as described above, the feature extracting section 2, the phoneme matching section 4, the speech recognition section 6 and the database generator section 10 are implemented by, for example, a computer such as a digital computer or the like. Further, the buffer memory 3, the HMM memory 5, the statistical language model memory 7 and the database memory 8 are implemented by, for example, a hard disk memory or the other storage units.

Next, an example of the speech recognition apparatus for English processing will be described. An instance of the examples of the context-free grammar rules in the English processing is shown in the following Tables 4 and 5. It is to be noted that the similarity rules shown in Table 3 is used as it is.

TABLE 4

| Example 11 |
|---|
| X at Y |
| start at 7:30 |
| leave at 6 p.m. |

TABLE 5

| Example 12 |
|---|
| Z · X |
| the train starts |

Figure 5:
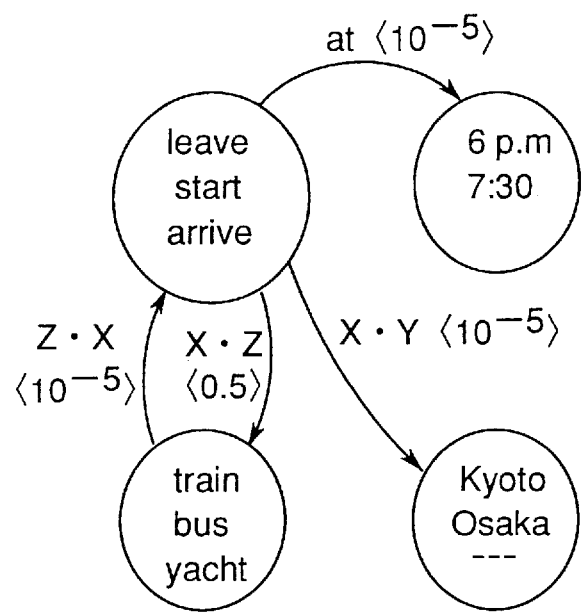
FIG. 5 is a view showing a relationship between English word set and distance in the speech recognition apparatus of FIG. 1.

FIG. 5 shows an instance of English word sets S11, S12, S13 and S14, as well as distances resulting when predetermined functional words are used between the word sets.

Referring to FIG. 5, for example, for a partial sentence of "train leaves", the distance is $10^{-5}$, and for "leave train", the distance is 0.5. Also, for a partial sentence of "leave Kyoto", the distance is $10^{-5}$, and for a partial sentence of "leave at 6 p.m.", the distance is $10^{-5}$.

The database generator section 10 performs the database generating process using the examples of Tables 4 and 5 and the similarity rules of Table 3, as follows. With a partial sentence generated from a combination of word sets, if the partial sentence is "the train starts", then the distance is 0; if the partial sentence is "the bus leaves", then the distance is $10^{-5}$; and if partial sentence is "leave yacht", then the distance is 0.5. The database of examples and distances of partial sentences generated in this way is stored in the database memory 8.

FIG. 6 is an operational view showing the operation of an English processing of the speech recognition apparatus of FIG. 1 constructed as described above, wherein FIG. 6(*a*) shows an input English sentence, FIG. 6(*b*) shows a sentence of recognition results and its parsing tree and score, and FIG. 6(*c*) shows a sentence of results of parsing analysis and its parsing tree and score.

Figure 6:
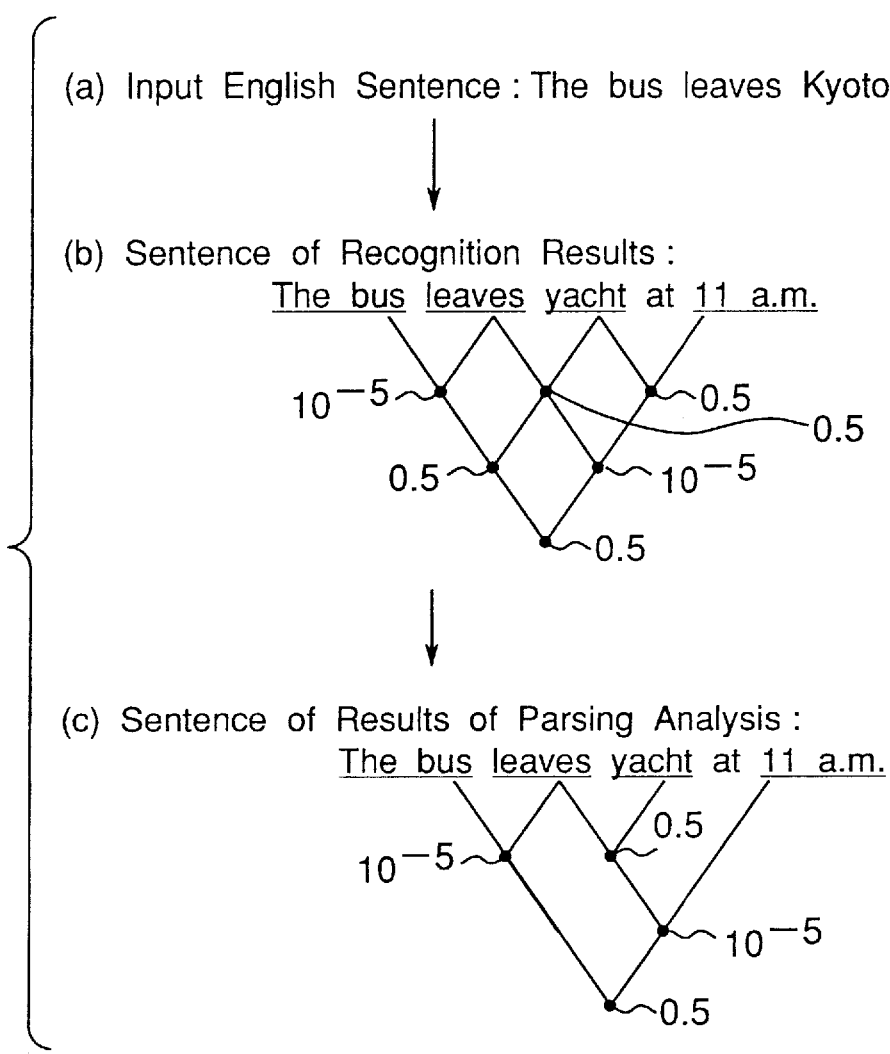

This is a case where when an input English sentence of speech, "The bus leaves Kyoto at 11 a.m.", is inputted as shown in FIG. 6(*a*), a sentence of "The bus leaves yacht at 11 a.m." is obtained as a sentence of recognition result. That is, this is such a case that "Kyoto" of a proper noun of the name of a place is mis-recognized as "yacht" of a noun, as shown in FIG. 6(*b*). The scores between words in the sentence of recognition results are shown in FIG. 6(*b*). Further, when parsing analysis is performed based on the sentences of recognition results, parse trees of results of parsing analysis is obtained based on a smaller score, as shown in FIG. 6(*c*), where the score at that time is obtained. If the case of FIG. 6(*c*) is applied to the Equation (1), then the erroneous sentence judging function $F_{error}(m)$ can be written as the following Equation (3):

$$F_{error}(m) = (5/4)(10^{-5} + 0.5 + 0.5 + 10^{-5}) \quad (3)$$
$$= 1.25 \times (1.00002)$$
$$= 1.250025$$

Since the functional value of 1.250025 calculated at the Equation (3) is beyond the threshold value Fth, speech recognition candidates corresponding to the functional value are eliminated out of the speech recognition candidates.

EXPERIMENTS

The present inventors performed the following experiments in order to evaluate the effectiveness of the speech recognition apparatus equipped with the above erroneous sentence detecting method. In these experiments, we confirmed whether or not the aforementioned erroneous sentence judging function $F_{error}(m)$ is able to discriminate between a mis-recognized sentence and a correct sentence in a recognition experiment using the N-gram language model. More specifically, we calculated the erroneous sentence judging function $F_{error}(m)$ for sentences of mis-recognition results and the correct sentence based on a recognition system using the bi-gram, and then discussed differences in functional values $F_{error}(m)$ of the erroneous sentence judging function between the sentences of mis-recognition results and the correct sentence. In the correct sentence, it could be presumed that the larger the number m of morphemes is, that is, the longer the partial sentence is, the more complex the sentence structure becomes while the lower the ambiguity of structure becomes, so that the smaller the functional value $F_{error}$ becomes, making it easier to distinguish from sentences of mis-recognition. However, taking into consideration the efficiency of recognition process, it is preferable to perform the judgment of unsuitability with respect to partial sentences of speech recognition candidates as early as possible, namely, at stages of smaller number m of morphemes, and to eliminate erroneous sentences as mis-recognized sentences out of the result candidates. In order to know the number m of morphemes for obtaining a functional value $F_{error}$ with high reliability, we calculated the functional value $F_{error}$ with respect to partial sentences of speech recognition candidates delimited by the m-th morpheme of mis-recognized or correct sentences, while we also investigated changes in the functional value $F_{error}$ with the number m of morphemes changed. Speech recognition and data conditions in the experiments are shown in Table 6.

TABLE 6

| Speech Recognition and Data Conditions | |
|---|---|
| Task | Speech dialogue conversation database for tourist guide |
| Acoustic model | Speaker independent HM-net, 401 states, 10 mixed distribution |
| Language model | Bi-gram of words |
| Speech recognition method | One pass DP, N-best search |
| Bi-gram training data | 3363 sentences, 222954 words |
| Evaluation data | 44 sentences, 4 speakers contained in training data |

Figure 4:
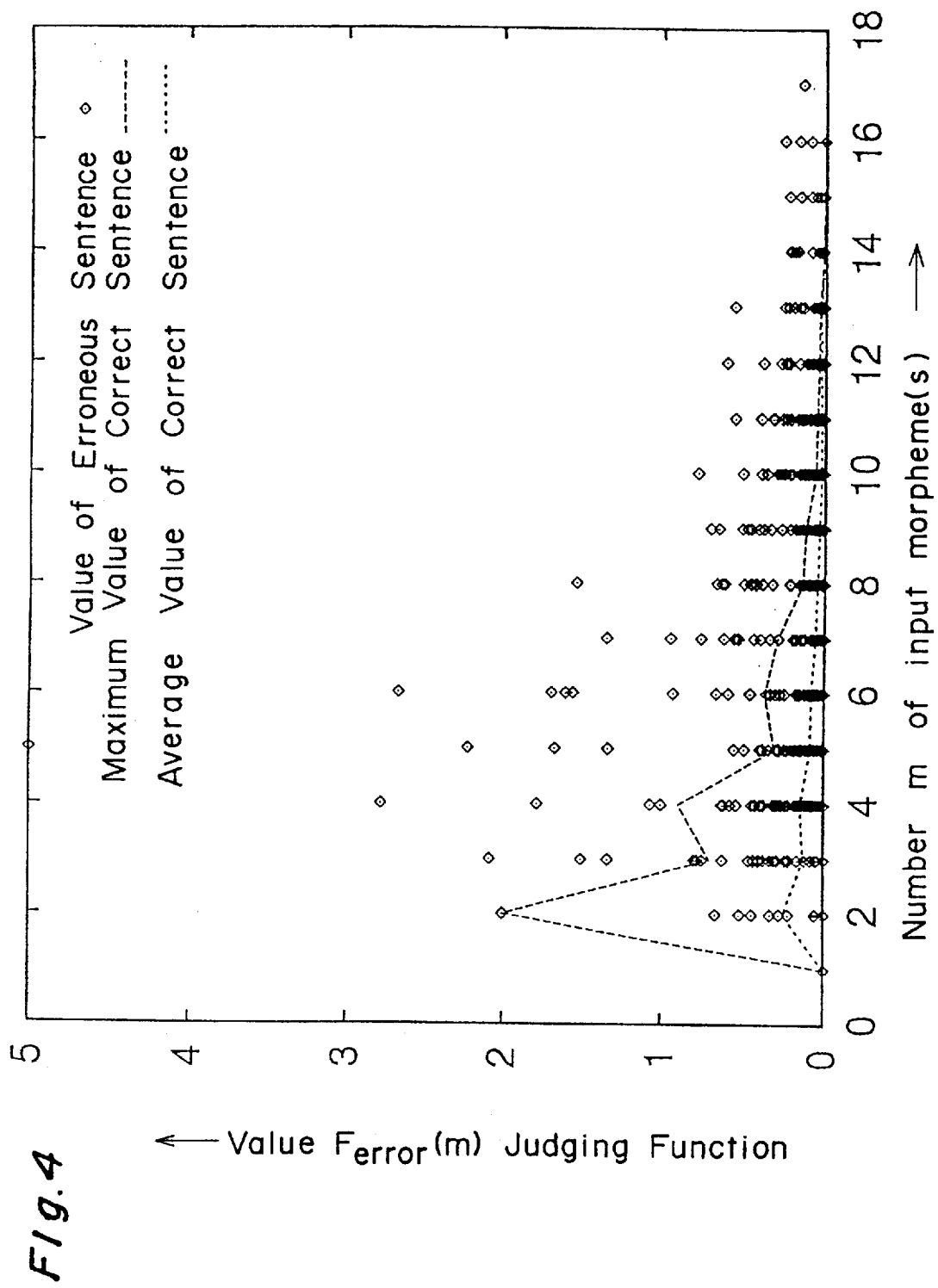
FIG. 4 is a graph showing the value $F_{error}$ of judging function relative to a number of input morphemes, which is simulation results of the speech recognition apparatus of FIG. 1.

The speech recognition process was performed by using the bi-gram of words as the statistical language model, and by using a speech recognition system of the One pass DP algorithm and N-best search type. The evaluation data as shown in Table 6 was used as the correct sentence. The evaluation data was recognized by a recognition system using the three kinds of N-grams as shown in Table 6, and 94 mis-recognized sentences of the recognition results were used as the mis-recognized sentences. FIG. 4 shows average and maximum values of the functional value $F_{error}$ with respect to the correct sentence, and the functional value $F_{error}$ with respect to the mis-recognized sentences, for each number m of morphemes. As is apparent from FIG. 4, the following can be seen:

(a) With respect to the correct sentence, the larger the number m of morphemes is, both average and maximum values of the functional value $F_{error}$ decrease; and (b) In a manner similar to that of the mis-recognized sentences, the larger the number of morphemes is, the functional value $F_{error}$ tends to decrease, but the degree of decrease is less than that of the correct sentence.

From these findings, it is shown that in the left-to-right speech recognition process system, there is little difference in the functional value $F_{error}$ between the correct sentence and mis-recognized sentences at earlier stages of the sentence where only smaller numbers of morphemes have been processed, this makes it difficult to detect any erroneous sentences. On the other hand, the larger the number of processed morphemes is, the more difference there arises in the functional value $F_{error}$ between the correct sentence and mis-recognized sentences, so that the detection of erroneous sentences can be enabled by setting the threshold value Fth to a proper one. However, it can be seen that this threshold value Fth is more effective when defined as a functional value with the number m of morphemes taken as a parameter than when defined as a constant value. For instance, when the maximum value in FIG. 4 is taken as the threshold value Fth, a sentence showing a functional value $F_{error}$ higher than this threshold value Fth can be judged as an erroneous sentence during the processing of each of the number m of morphemes. The ratio of sentences that were able to be judged as mis-recognition from on-the-way results of the sentence was 47.9% (=45/94) among all the mis-recognized sentences in this experiment. These results can be summarized as follows:

(a) It was found that the two parameters used for the detection of erroneous sentences, both of (1) the semantic distance between an input phrase and examples and (2) the complexity of sentence structure represented by the number of rules relative to the number of morphemes, are parameters effective for judging erroneous sentences, and that the proposed erroneous sentence judging function $F_{error}$ is effective for detecting erroneous sentences;

(b) The detection performance of erroneous sentences is determined depending on the number m of morphemes, and the larger the number m is, the more the detection performance increases; and (c) The threshold value Fth of the erroneous sentence judging function $F_{error}$ is preferably changed depending on the number m of morphemes, so that erroneous sentences can be detected with a higher efficiency.

As described above, according to the present invention, there has been invented a method for sequentially detecting the unsuitability of the mis-recognized sentences of speech recognition using a conventional statistical language model, by using a syntactic construction determining method for determining the syntactic construction with solving the ambiguity of the syntactic construction, with the use of semantic distances to examples. This method of the present invention employs the semantic distance between phrases contained in a partial sentence of recognition results and previously trained examples as well as the complexity of the syntactic construction of the partial sentence of recognition results, as the judging factors for erroneous sentences. In conclusion, as a result of detecting erroneous sentences for results of a recognition system using the bi-gram of various kinds of words, it has been found that properly setting the threshold value Fth for mis-recognized sentences and the correct sentence makes it possible to detect about a half of the mis-recognized sentences to be detected as erroneous sentences.

Therefore, since the speech recognition section 6 calculates the functional value of the erroneous sentence judging function with respect to speech recognition candidates by using a predetermined erroneous sentence judging function representing the degree of unsuitability for the speech recognition candidates. If the calculated functional value exceeds the predetermined threshold value, the speech recognition section 6 eliminates the pertinent speech recognition candidate, thus accomplishing the speech recognition. Thus, there can be provided a speech recognition apparatus which can eliminate erroneous mis-recognition results, output locally and generally suitable or correct sentences and obtain a speech recognition ratio higher than that of the prior art example.

In the above-mentioned preferred embodiment, there is used the Equation (1) as the erroneous sentence judging function. However, the present invention is not limited to this, and the following erroneous sentence judging functions indicated by the Equations (4) and (5) may be used:

$$F'_{error}(m) = \frac{m}{R} \sum_{i=1}^{R} \frac{d(r_i)}{R} \quad (4)$$

$$F''_{error}(m) = \frac{1}{M} \sum_{i=1}^{R} \frac{d(r_i)}{R} \quad (5)$$

The erroneous sentence judging function $F'_{error}(m)$ of the Equation (4) is characterized in being defined as a functional value obtained by calculating a sum of semantic distances corresponding to rules used in the speech recognition process, calculating an average value of the semantic distances which is obtained by dividing a calculated sum by the number of rules used in the speech recognition process, multiplying a calculated average value of the semantic distances by a number of morphemes contained in a speech recognition candidate for which speech recognition process is performed, and dividing a multiplied sum by a number of rules used in the speech recognition process, as compared with the erroneous sentence judging function $F_{error}(m)$ of the Equation (1). In this case, the rules used in the speech recognition process is preferably the rule used for determining the syntactic structures of the speech recognition candidates.

Further, in the equation (5), M represents a number of rules each of which includes a predetermined plurality $m_a$ or more of morphemes within the rules used in the speech recognition process at a stage when a predetermined number m of morphemes has been processed. In this case, the rules used in the speech recognition process is preferably the rule used for determining the syntactic structures of the speech recognition candidates. Further, m is preferably set to a value equal to or larger than five, and $m_a$ is preferably set to three. The erroneous sentence judging function $F''_{error}(m)$ of the Equation (5) is characterized in using a reciprocal of the number of rules M instead of (m/R), as compared with the erroneous sentence judging function $F'_{error}(m)$ of the Equation (4).

When the speech recognition process is performed using the erroneous sentence judging function of the Equation (4)

or (5), there can be provided a speech recognition apparatus which can eliminate erroneous mis-recognition results, output locally and generally suitable or correct sentences and obtain a speech recognition ratio higher than that of the prior art example.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A speech recognition apparatus comprising:

speech recognition means for performing a speech recognition process on an uttered speech with reference to a predetermined statistical language model, based on a series of speech signal of the uttered speech sentence composed of a series of input words, wherein said speech recognition means calculates a functional value of a predetermined erroneous sentence judging function with respect to speech recognition candidates, said erroneous sentence judging representing a degree of unsuitability for the speech recognition candidates, and wherein said speech recognition means performs the speech recognition process by eliminating a speech recognition candidate corresponding to a calculated functional value when the calculated functional value exceeds a predetermined threshold value.

2. The speech recognition apparatus as claimed in claim 1, wherein the functional value of the erroneous sentence judging function is a value obtained by calculating a sum of semantic distances corresponding to rules used in the speech recognition process, multiplying a calculated sum by a number of morphemes contained in a speech recognition candidate for which speech recognition process is performed, and dividing a multiplied sum by a number of rules used in the speech recognition process.

3. The speech recognition apparatus as claimed in claim 2, wherein the threshold value is a constant value.

4. The speech recognition apparatus as claimed in claim 2, wherein the threshold value is changed depending on a number of morphemes contained in a partial sentence for which the speech recognition process is performed.

5. The speech recognition apparatus as claimed in claim 1, wherein the functional value of the erroneous sentence judging function is a value obtained by calculating a sum of semantic distances corresponding to rules used in the speech recognition process, calculating an average value of the semantic distances which is obtained by dividing a calculated sum by the number of rules used in the speech recognition process, multiplying a calculated average value of the semantic distances by a number of morphemes contained in a speech recognition candidate for which speech recognition process is performed, and dividing a multiplied sum by a number of rules used in the speech recognition process.

6. The speech recognition apparatus as claimed in claim 5, wherein the threshold value is a constant value.

7. The speech recognition apparatus as claimed in claim 5, wherein the threshold value is changed depending on a number of morphemes contained in a partial sentence for which the speech recognition process is performed.

8. The speech recognition apparatus as claimed in claim 1, wherein the functional value of the erroneous sentence judging function is a value obtained by calculating a sum of semantic distances corresponding to rules used in the speech recognition process, calculating an average value of the semantic distances which is obtained by dividing a calculated sum by the number of rules used in the speech recognition process, and dividing a calculated average value of the semantic distances by a number of rules each of which -includes a predetermined plurality or more of morphemes within the rules used in the speech recognition process at a stage when a predetermined number of morphemes has been processed.

9. The speech recognition apparatus as claimed in claim 8, wherein the threshold value is a constant value.

10. The speech recognition apparatus as claimed in claim 8, wherein the threshold value is changed depending on a number of morphemes contained in a partial sentence for which the speech recognition process is performed.

11. The speech recognition apparatus as claimed in claim 1, wherein the threshold value is a constant value.

12. The speech recognition apparatus as claimed in claim 1, wherein the threshold value is changed depending on a number of morphemes contained in a partial sentence for which the speech recognition process is performed.

* * * * *